United States Patent [19]

Van Gompel

[11] 3,998,167
[45] Dec. 21, 1976

[54] METHOD AND APPARATUS FOR BRACING FREIGHT
[75] Inventor: James J. Van Gompel, Fremont, Ind.
[73] Assignee: Brammall, Incorporated, Angola, Ind.
[22] Filed: Mar. 17, 1976
[21] Appl. No.: 667,593
[52] U.S. Cl. .............................. 105/477; 24/136 A; 105/368 R; 105/368 T; 105/470; 105/473; 254/51
[51] Int. Cl.² .......................................... B65J 1/22
[58] Field of Search ......... 24/136 A; 105/473, 477, 105/474, 475, 481, 482, 470, 487, 368 T, 368 R; 52/DIG. 11, 23; 248/499; 254/51, 68, 69

[56] References Cited
UNITED STATES PATENTS

| 2,128,667 | 8/1938 | Atherton | 105/368 T |
| 2,243,346 | 5/1941 | Kinninger | 254/51 |
| 2,773,700 | 12/1956 | Lasswell | 254/51 |
| 3,063,677 | 11/1962 | Snyder | 254/51 |

FOREIGN PATENTS OR APPLICATIONS

| 1,047,517 | 7/1953 | France | 254/51 |
| 1,782 | 1/1913 | United Kingdom | 24/136 A |

Primary Examiner—Paul R. Gilliam
Assistant Examiner—Kenneth J. Dorner
Attorney, Agent, or Firm—Hill, Gross, Simpson, Van Santen, Steadman, Chiara & Simpson

[57] ABSTRACT

An apparatus for bracing items of freight on the loading platform of a freight carrying vehicle has a rod or cable tie-down having one end connected to an anchor on the loading platform. The opposite end of the tie-down is positioned through an aperture in a frame member of the item of freight. First and second locking means are positioned over the opposite end of the tie-down with an expansion means therebetween. The locking means slide over the cable in one direction but lock to the cable in the opposite direction. When the expansion means expands, one locking means grabs the cable while the other is slid along the cable into tight abutment with the frame member to create a tension in the cable.

8 Claims, 3 Drawing Figures

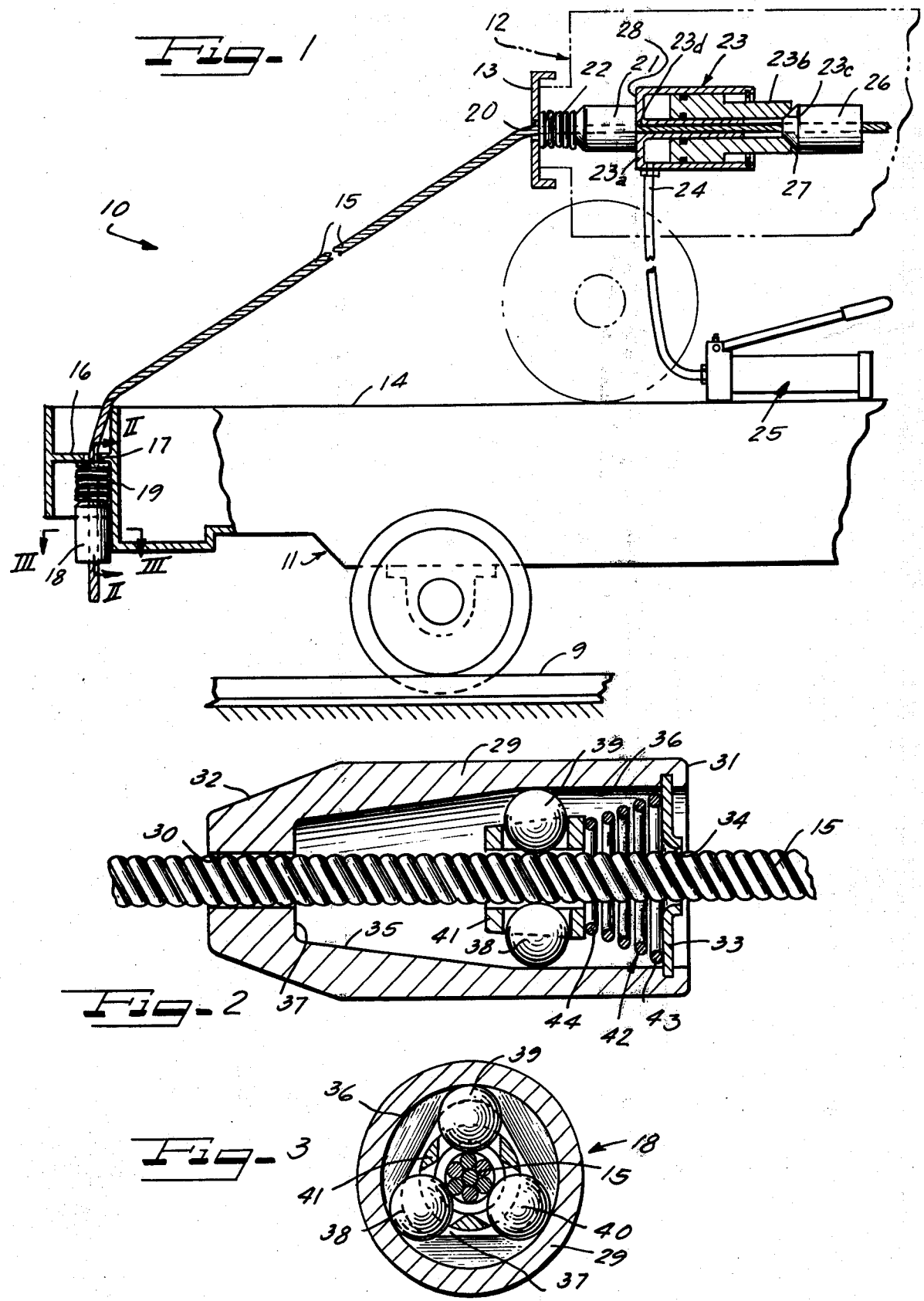

METHOD AND APPARATUS FOR BRACING FREIGHT

BACKGROUND OF THE INVENTION

1. Field of the Invention

This invention relates to a bracing system and more particularly to a bracing system for items of freight on a freight carrying vehicle.

2. Description of the Prior Art

Railroad flat cars or flatbed trucks are frequently used to transport heavy equipment such as road construction equipment or farm machinery. Such equipment must be firmly secured to a loading surface of the vehicle to insure stability of the items of freight during transportation. Previously, rods or cables have been combined with turnbuckles to provide tie-down assemblies between various anchoring points on the loading surface and the item of freight being secured. Such turnbuckle tie-downs were expensive to install since adjustment of the turnbuckle required considerable labor. Furthermore, the unauthorized removal of items of freight could be effected by simply unwinding the turnbuckles. Finally, the tension of the various tie-downs could not be conveniently equalized.

SUMMARY OF THE INVENTION

It is an object of the present invention to provide a method and apparatus for bracing items of freight which is simple to install and inexpensive.

It is a further object of this invention to provide an apparatus and method for bracing items of freight which is secure and tamperproof.

It is another object of this invention to provide a method and apparatus for bracing items of freight wherein the tie-downs may be adjusted for approximately equal tension.

In the present invention, an item of freight is placed upon the loading platform of a freight carrying vehicle. The item of freight to be secured has one or more frame members each having an aperture therein. A tie-down member such as a cable or rod has one end connected to an anchoring point on a surface of the loading platform. The other end of the cable or rod is received through the frame member aperture. First and second locking means are connected to the end of the tie-down member and an expansion means is provided therebetween. The first and second locking means are adapted to slide along the cable in one direction but to lock in the opposite direction. When the expansion means is expanded between the first and second locking means, the second locking means locks to the cable and the first locking means is slid forward to abut against the frame member. Consequently, the tie-down is drawn tighter.

BRIEF DESCRIPTION OF THE DRAWING

FIG. 1 is a side view of the apparatus of this invention for bracing items of freight on loading surface of a freight carrying vehicle;

FIG. 2 is a cross-sectional view taken along line II—II of FIG. 1 illustrating a locking device of this invention; and FIG. 3 is a cross-sectional view taken along line III—III of FIG. 1 also illustrating the construction details of the locking device of this invention.

DESCRIPTION OF THE PREFERRED EMBODIMENTS

An apparatus for bracing items of freight is shown generally at 10 in FIG. 1. A vehicle 11 for carrying freight such as a railroad flat car on rails 9 or a flatbed truck is provided which has a loading surface 14. Freight 12 to be braced, such as a tractor, is positioned on the loading surface 14. A frame member 13 on the item of freight 12 has a tie-down such as a rod or cable 15 attached between the frame member 13 and an anchor point or staking surface 16. The tie-down member 15 is preferably attached to the anchor point 16 by positioning one end of the tie-down 15 through an aperture 17 and securing the tie-down below the aperture with a locking device 18 described below. A spring 19 is positioned between the locking device and aperture 17.

The opposite end of the tie-down 15 is positioned through an aperture 20 in the frame member 13. A coil spring 22 is positioned over the end of the cable on the opposite side of the frame member and a locking device 21 is slidably engaged over the end of the tie-down 15. A hydraulic cylinder 23 having a hollow piston is slipped over the end of the tie-down 15. The hydraulic cylinder 23 has an outer cylinder 23a, an inner hollow piston 23b, an aperture 23c within the inner piston 23b, and an aperture 23d at an end of the outer cylinder 23a. The tie-down 15 is aligned through these apertures. Finally, a locking device 26 is slipped over the end of the tie-down 15 to abut an end 27 of the hydraulic cylinder 23.

A hydraulic pump 25 connected to the hydraulic cylinder 23 causes the cylinder to expand and force the opposite cylinder ends 27 and 28 to abut with locking devices 26 and 21, respectively.

It is to be realized that a number of cables are used to fasten the freight and hold it against movement in opposite directions but only one unit is illustrated.

Each of the locking devices 18, 21, and 26 is similar to the type described in my U.S. Patent application Ser. No. 610,062 filed Sept. 3, 1975. When positioned over a cable or rod, these locking devices are slidable in a first direction but lock in the opposite direction. Consequently, the locking devices 21 and 26 are aligned in a common direction such that when the cylinder 23 expands, the locking device 26 locks and the locking device 21 is slid along the tie-down 15 to compress springs 22 and 19. Also, locking device 19, positioned below the anchoring point and aligned in a direction opposite to that of devices 21 and 26, locks as the cylinder 23 expands. Therefore, the tie-down 15 is drawn taunt and one end of the item of the freight 12 is securely braced. Thereafter, the cylinder 23 is contracted and the tie-down 15 is cut at a point spaced from the end of the locking member 21. The locking member 26 may then be removed from the cut portion of the tie-down member 15 and used together with the cylinder 23 for tensioning another tie-down member attached elsewhere on the item of freight.

Once secured, the tie-down 15 may be removed only by cutting since the locking devices 21 and 18 are tamperproof and non-removable.

If a pressure gauge is added to the hydraulic pump 25, the tension on a plurality of tie-downs may be equalized by applying the same hydraulic pressure when tensioning each of the tie-downs. As explained previously, the locking devices 18, 21, and 26 are very similar to the device described in my serial number 610,062. The dimensions of the locking devices in this environment, however, are larger and of greater strength than those described in my previous application.

As shown in FIG. 2, the locking shell of the locking device 18, 21, or 26 includes a generally cylindrical shell member 29 with a conical front portion formed with a central opening 30 at a first end which opens into a larger opening 37 which extends to the end 31. The opening 30 at the end 32 of the shell is large enough to allow the end of the tie-down 15 to pass therethrough and a retainer member 33 formed with a central opening 34 is secured in the body member 29 adjacent the end 31 as shown. The internal space of the locking shell is formed with a cylindrical opening 36 and a tapered opening 35. The cylindrical opening 36 is adjacent the end 31 and the end retainer 33 and joins to the tapered opening 35 to the end 37. As shown in FIG. 2, the conical tapered opening extends from the opening 36 and generally by transition goes into a triangular shaped opening before point 37.

A cluster of balls 38, 39, and 40 are held by a ball retainer 41 which has a central opening through which the balls extend and through which the cable 15 can extend. The retainer 41 is also formed with openings such that the balls 38, 39, and 40 can engage the inner surface of the locking shell as shown in FIGS. 2 and 3.

A coil spring 42 has a first end 43 which bears against the end plate 33 and a second end 44 which bears against the ball retainer 41 so as to bias it to the left relative to FIG. 2.

The diameter of the cylindrical portion 30 of the internal opening of the locking shell is chosen such that when the tie-down 15 is inserted through the locking shell, the balls will allow relatively free passage of the cable to the right as shown in FIG. 2. The tapered portion between points 36 and 37 of the internal opening 35 is such that upon the application of tension to the tie-down 15 the tie-down moves to the left relative to the shell 29, the balls 38, 39, and 40 will be cammed by the surface between the points 37 and 36 towards the center line of the tie-down 15 thus locking the tie-down so that it cannot be withdrawn by moving it to the left relative to FIG. 2.

In operation, the end of the tie-down is inserted through the opening 30 until it bears against the balls 38, 39, and 40. It is further inserted into the locking shell and pushes the balls and the ball retainer 41 to the right relative to FIG. 2, thus allowing the balls 38, 39, and 40 to move away from the tie-down until the balls reach the point 36 illustrated in FIG. 2. The tie-down 15 can freely pass through the space between the balls and out the opening 34 of the retaining wall 33. Any attempt to move the tie-down to the left relative to FIG. 2 will immediately cause the balls 38, 39, and 40 to move on the internal conical and triangular shaped surface between points 36 and 37, thus moving the balls together and applying pressure on the tie-down 15 so as to lock it from movement to the left relative to FIG. 2.

It should be obvious to those skilled in the art that a plurality of tie-downs 15 may be tensioned in accordance with the teachings of this invention at various points around the item of freight being braced.

It is seen that this invention provides new and novel bracing means and although it has been described with respect to preferred embodiments, it is not to be so limited as changes and modifications may be made which are within the full, intended scope of the invention as defined by the appended claims.

I claim as my invention:

1. An apparatus adapted for bracing items of freight comprising in combination:
   a. a freight carrying vehicle having a loading platform;
   b. an item of freight on said platform having a frame member with an opening;
   c. an anchoring means on said loading platform;
   d. an elongated member having one end connected to said anchoring means, the other end being received through said frame member opening;
   e. first locking means connected to said other end of the elongated member for slidably engaging said elongated member in one direction and locking to said elongated member in an opposite direction;
   f. second locking means connected to said other end of the elongated member for slidably engaging said elongated member in said one direction and locking to said elongated member in said opposite direction; and
   g. expansion means between said first and second locking means for locking said second locking means and sliding said first locking means over said elongated member into abutment with said frame member to tension said elongated member.

2. The apparatus of claim 1 in which a spring is positioned between said frame member and first locking means.

3. The apparatus of claim 1 in which said anchoring means, has an aperture, and a third locking means slidably engages said elongated member in said opposite direction and locks to the one end of said elongated member in said one direction below said aperture to retain said one end at the anchoring means.

4. The apparatus of claim 1 in which said first and second locking means comprise a locking shell with interior sloping walls and having a plurality of balls held within the locking shell by a spring loaded retainer.

5. The apparatus of claim 1 in which said expansion means comprises a hollow piston hydraulic cylinder, said elongated member being aligned within said hollow piston and cylinder.

6. An apparatus adapted for bracing items of freight, comprising in combination:
   a. a freight carrying vehicle having a loading platform;
   b. an item of freight on said platform having a frame member with an opening;
   c. an anchoring means on said loading platform;
   d. a cable having a locking means and spring at one end retained by said anchoring means, the other end being received through said frame member opening;
   e. two locking means connected to said other end of the cable;
   f. all of said locking means having means for slidably engaging said elongated member in one direction and locking to said elongated member in an opposite direction;
   g. a spring between one of said two locking means and said frame member opening; and
   h. expansion means between said two locking means for locking one and sliding the other of said two locking means on said cable.

7. A method for bracing an end of an item of freight on a loading surface of a vehicle comprising the steps of:
   a. anchoring one end of a tie-down member to said loading surface;
   b. threading a portion of the opposite end of said tie-down member through an opening in a frame member at an end of the item of freight;
   c. slidably engaging in a first direction a first locking means over said tie-down member portion into abutment with said frame member, said first locking means locking to said tie-down member when moved in an opposite direction;
   d. positioning an expansion means against said first locking means;
   e. slidably engaging in said first direction a second locking means over said tie-down member portion into abutment with said expansion means, said second locking means locking to said tie-down member when moved in said opposite direction; and
   f. expanding said expansion means to slide said first locking means and lock said second locking means to tighten said tie-down member.

8. The method of claim 7 including the step of compressing a spring between said first locking means and frame member opening.

* * * * *